United States Patent
Martini et al.

(10) Patent No.: US 11,936,528 B2
(45) Date of Patent: *Mar. 19, 2024

(54) APPLYING NETWORK POLICIES TO DEVICES BASED ON THEIR CURRENT ACCESS NETWORK

(71) Applicant: iboss, Inc., Boston, MA (US)

(72) Inventors: Paul Michael Martini, Boston, MA (US); Peter Anthony Martini, Boston, MA (US)

(73) Assignee: iboss, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/114,167

(22) Filed: Feb. 24, 2023

(65) Prior Publication Data

US 2023/0224220 A1 Jul. 13, 2023

Related U.S. Application Data

(63) Continuation of application No. 17/848,258, filed on Jun. 23, 2022, now Pat. No. 11,595,262, which is a
(Continued)

(51) Int. Cl.
*H04L 41/0893* (2022.01)
*H04L 43/10* (2022.01)
(Continued)

(52) U.S. Cl.
CPC ......... *H04L 41/0893* (2013.01); *H04L 43/10* (2013.01); *H04L 67/10* (2013.01);
(Continued)

(58) Field of Classification Search
CPC . H04L 41/0893; H04L 43/10; H04L 61/2514; H04L 67/10; H04L 67/52; H04L 67/34
See application file for complete search history.

(56) References Cited

U.S. PATENT DOCUMENTS 7,523,316 B2 * 4/2009 Cheng ..................... G06F 21/34
713/182
7,899,019 B1 3/2011 Evans
(Continued)

FOREIGN PATENT DOCUMENTS

EP          2713 583 A1    4/2014
WO    WO 2014/161478      10/2014
WO    WO 2015/131811       9/2015

OTHER PUBLICATIONS

Aura, EESR from corresponding European Application No. 17796996 dated Mar. 15, 2019, 8 pages.
(Continued)

*Primary Examiner* — Mohamed A. Wasel
(74) *Attorney, Agent, or Firm* — Fish & Richardson P.C.

(57) ABSTRACT

A server of a distributed computing system that is at least partially hosted on a particular access network receives a plurality of messages from a plurality of devices over a network, each of the messages associated with a corresponding source address. For each of the plurality of devices, a current access network is determined for the device. For each of the devices with a current access network being the particular access network, a first network policy is applied to the device. For each of the devices with a current access network being other than the particular access network, a second network policy is applied to the device, the second network policy defining a second encryption requirement.

20 Claims, 4 Drawing Sheets

Related U.S. Application Data continuation of application No. 17/021,649, filed on Sep. 15, 2020, now Pat. No. 11,374,818, which is a continuation of application No. 16/684,469, filed on Nov. 14, 2019, now abandoned, which is a continuation of application No. 15/153,506, filed on May 12, 2016, now abandoned.

(51) Int. Cl.
*H04L 67/00* (2022.01)
*H04L 67/10* (2022.01)
*H04L 67/52* (2022.01)
*H04L 61/2514* (2022.01)

(52) U.S. Cl.
CPC ............. *H04L 67/34* (2013.01); *H04L 67/52* (2022.05); *H04L 61/2514* (2013.01)

(56) References Cited

U.S. PATENT DOCUMENTS

| | | | |
|---|---|---|---|
| 8,020,192 | B2 | 9/2011 | Wright |
| 8,484,353 | B1 | 7/2013 | Johnson et al. |
| 8,644,822 | B1 | 2/2014 | Phillips |
| 8,675,488 | B1 | 3/2014 | Sidebottom |
| 8,958,828 | B2 | 2/2015 | Zheng |
| 8,972,589 | B2 | 3/2015 | Roese |
| 8,990,891 | B1 | 3/2015 | Chickering |
| 9,407,664 | B1 | 8/2016 | Banerjee |
| 9,600,670 | B2 * | 3/2017 | Goss .................. G06F 21/57 |
| 9,781,130 | B1 | 10/2017 | Bailey |
| 10,015,131 | B2 | 7/2018 | Matsuda |
| 10,652,745 | B2 * | 5/2020 | Beachem ............. H04L 63/102 |
| 10,931,682 | B2 | 2/2021 | Ezra et al. |
| 2002/0141343 | A1 | 10/2002 | Bays |
| 2004/0123150 | A1 | 6/2004 | Wright |
| 2004/0177107 | A1 | 9/2004 | Qing |
| 2005/0125688 | A1 | 6/2005 | Ogawa et al. |
| 2005/0138604 | A1 | 6/2005 | Harrison |
| 2006/0094400 | A1 * | 5/2006 | Beachem ................ H04W 4/02 455/410 |
| 2006/0120526 | A1 | 6/2006 | Boucher |
| 2007/0186106 | A1 | 8/2007 | Ting |
| 2007/0282981 | A1 | 12/2007 | Cohen |
| 2008/0057923 | A1 | 3/2008 | Pousti |
| 2008/0244741 | A1 | 10/2008 | Gustafson |
| 2009/0065578 | A1 | 3/2009 | Peterson |
| 2009/0135723 | A1 | 5/2009 | Davidson |
| 2009/0182843 | A1 | 7/2009 | Hluchyj |
| 2009/0276827 | A1 | 11/2009 | Zheng |
| 2012/0023562 | A1 | 1/2012 | Harp |
| 2013/0005296 | A1 | 1/2013 | Papakostas |
| 2013/0031615 | A1 | 1/2013 | Woodward |
| 2013/0052990 | A1 | 2/2013 | Zhang |
| 2013/0144998 | A1 | 6/2013 | Squire et al. |
| 2013/0227659 | A1 | 8/2013 | Raleigh |
| 2013/0237191 | A1 | 9/2013 | Mahaffey |
| 2014/0045457 | A1 | 2/2014 | Mahaffey |
| 2014/0064094 | A1 | 3/2014 | Shaikh |
| 2014/0161478 | A1 | 6/2014 | Oh et al. |
| 2015/0055510 | A1 | 2/2015 | Gao |
| 2015/0133125 | A1 | 5/2015 | Glickfield |
| 2015/0181415 | A1 | 6/2015 | Raleigh |
| 2015/0131811 | A1 | 9/2015 | Hangzhou |
| 2015/0301982 | A1 | 10/2015 | Martini |
| 2015/0312257 | A1 | 10/2015 | Antipa |
| 2015/0341359 | A1 | 11/2015 | Yang |
| 2016/0183041 | A1 | 6/2016 | Sanders |
| 2016/0183166 | A1 | 6/2016 | Chen |
| 2016/0234267 | A1 | 8/2016 | Hebbar |
| 2016/0275557 | A1 | 9/2016 | Barrand |
| 2017/0250951 | A1 | 8/2017 | Wang et al. |

OTHER PUBLICATIONS

Aura, Office Action from corresponding European Application No. 17796996 dated Jul. 31, 2020, 6 pages.
Aura, Office Action from corresponding European Application No. 17796996 dated Mar. 31, 2021, 8 pages.
Grant, International Search Report from corresponding PCT Application No. PCT/US17/32533 dated Jun. 8, 2017, 10 Pages.
Lau, Office Action in corresponding Canadian Application Serial No. 3,023,992 dated Oct. 1, 2020, 6 pages.
Microsoft, "Network Policy and Access Services Overview", downloaded from the internet at https://technet.microsoft.com/enus/library/cc731321.aspx on Jul. 13, 2015, 3 pages.
Microsoft, "Network Policy Conditions Properties", downloaded from the internet at https://technet.microsoft.com/enus/library/cc731220(v=ws.10).aspx on Jul. 13, 2015, 4 pages.
Nakra, Office Action in corresponding Canadian Application Serial No. 3,023,992 dated Sep. 24, 2019.
Regis, International Preliminary Report on Patentability in corresponding PCT Application No. PCT/US17/32533 dated Nov. 13, 2018, 7 Pages.
Technet, "Network Location Awareness (NLA) and how it relates to Windows Firewall Profiles", downloaded from the internet at http://blogs.technet.com/b/networking/archive/2010/09/08/networklocationawarenessnlaandhowitrelatestowindowsfirewallprofiles.aspx on Jul. 13, 2015, 6 pages.

\* cited by examiner

APPLYING NETWORK POLICIES TO DEVICES BASED ON THEIR CURRENT ACCESS NETWORK

CROSS-REFERENCE TO RELATED APPLICATIONS

This application is a continuation application of and claims priority to U.S. application Ser. No. 15/153,506, filed on May 12, 2016, U.S. application Ser. No. 16/684,469, filed on Nov. 14, 2019, U.S. application Ser. no. 17/021,649 filed on Sep. 15, 2020 (now U.S. Pat. No. 11,374,818), and U.S. application Ser. no. 17/848,258 filed on Jun. 23, 2022.

BACKGROUND

This specification generally relates to describes methods and systems for applying network policies to devices based on their current access network.

In corporate and other networks, user devices may be configured to access a network in different ways. For example, devices may receive configuration information when they log on to a network from a central location, or may be initialized with such configuration information at regular intervals. The configuration information may control the network access behavior of the particular device.

SUMMARY

In general, one aspect of the subject matter described in this specification may be embodied in systems, and methods performed by data processing apparatuses that include the actions of receiving a message from a device over a network, the message associated with a source address; determining a current access network for the device based at least in part on the source address; and applying a network policy to the device based on the determined current access network.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Network-enabled computing devices may be used to access resources on public networks (e.g., the Internet) from different access networks. For example, a user may use the same laptop computer to access the Internet while connected to a public Wi-Fi network at a coffee shop, a local network operated by the user's employer, a local network operated by another company (such as a client of the user's employer), a public network operated by a municipality, or other public or private networks. Each access network may have a different configuration, e.g., different levels of security, different bandwidth characteristics, etc. The access networks may also be operated by different entities (e.g., the employer, the coffee shop owner, etc.), meaning that data sent by computing devices on the network may be subject to monitoring by the entities or other activities that could be problematic for sensitive data sent by computing devices connected to the network. For example, if the network were operated by a competitor of the user's employer, the employer may not want sensitive data (or any data) to be sent unencrypted over the network.

Accordingly, the present specification describes techniques for applying network policies to devices based on their current access network. One example method includes receiving a message from a device over a network, the message associated with a source address. A current access network of the device is then determined based at least in part on the source address. A network policy is then applied to the device based on the determined current access network. In some cases, the message is received and the current access network determined by a computing device (e.g., a server) at an access network separate from the current access network of the device.

Implementations according to the present disclosure have several potential advantages. First, network behavior of computing devices may be managed more precisely than with previous techniques. For example, an administrator may configure a network policy so that certain resources (e.g., R&D servers) cannot be accessed from specific networks, such as those operated by competitors, or may require strong encryption (e.g., 64-bit or greater) for such access. Such a configuration may lessen the chance that the competitor will be able to eavesdrop on the communication and gain access to proprietary information. Further, the present techniques may offer greater flexibility than previous techniques, as the network behavior of the computing devices may be changed for specific access networks. The present techniques may also be more reliable than previous techniques, as effectively disguising the source address of the computing devices (e.g., by a malicious entity) in a way that is undetectable to the server applying the network policies may have the effect of disabling the network access of the computing device. For example, such a misconfiguration may be detected by the network infrastructure, which may disallow access to the network. The present techniques may also be more easily implemented than other approaches, as they follow standard network configuration procedures and generally use existing standard protocols.

Figure 1:
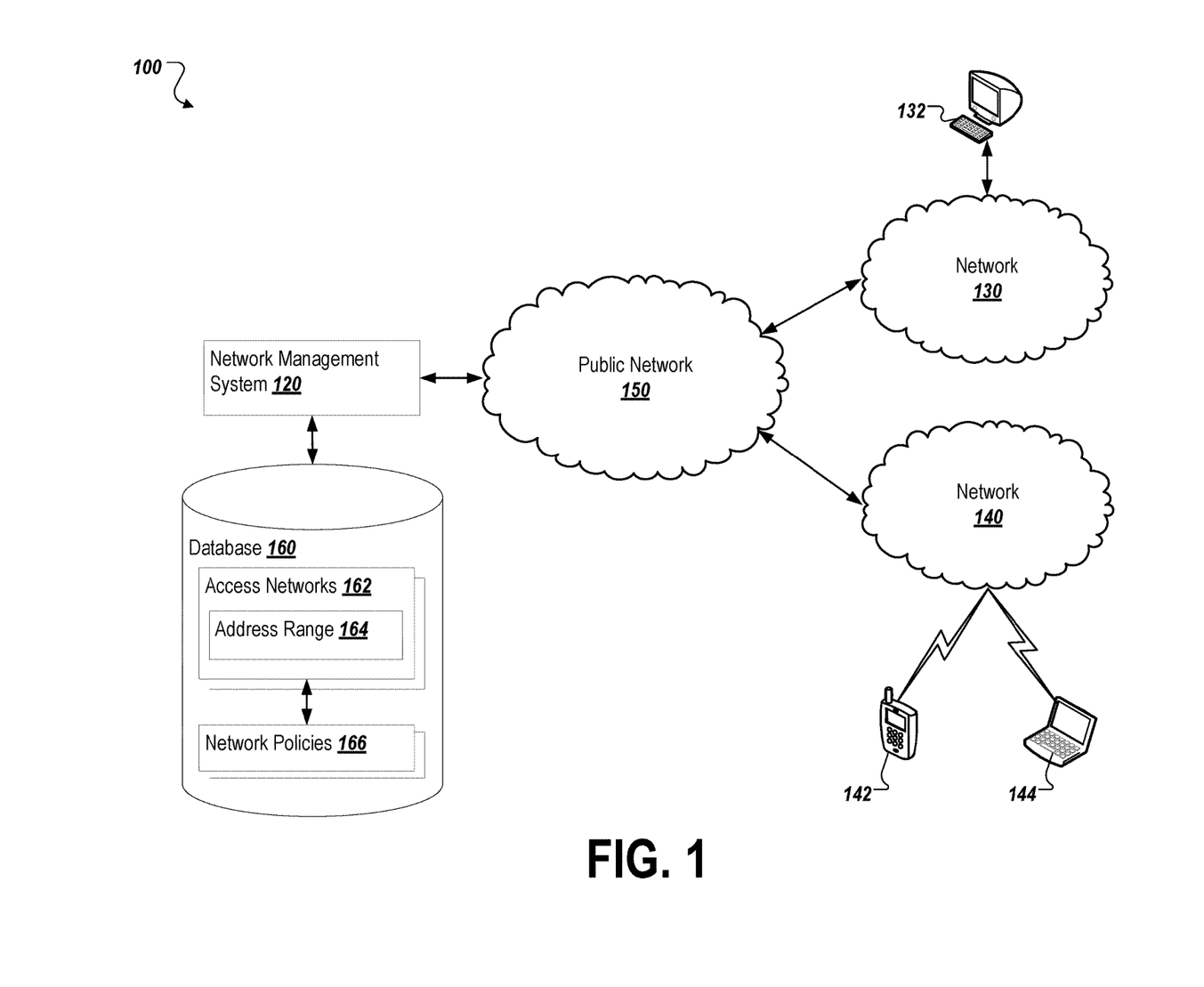
FIG. 1 is a diagram of an example environment for applying network policies to devices based on their current access network.

FIG. 1 is a diagram of an example environment for applying network policies to devices based on their current access network. As shown, the environment 100 includes networks 130, 140 connected to public network 150 (e.g., the Internet). The networks 130, 140 are used by connected devices 132, 142, 144 to access the public network 150. The network management system 120 is connected to the public network 150. In operation, the network management system 120 receives messages from the devices 132, 142, 144 over the public network 150. The network management system 120 analyzes the received messages to determine which of the networks 130, 140 the messages originated from. In some cases, the network management system 120 examines a source address associated with the received message to make this determination. This determination represents the current access network of the device that sent the message. The network management system 120 determines a network policy 166 to apply to the device sent the message based on this determined access network. In some cases, the network management system 120 is located access network separate from the access networks of the devices 132, 142, 144. For example, as shown in FIG. 1, the network management system 120 is not directly connected to the network 130 or the network 140.

The networks 130, 140 may be private or public networks through which the public network 150 can be accessed by connected devices. For example, the network 130 may be a local area network provided by a particular business to which the device 132 is connected. The network 130 may include a gateway (not shown) connecting the network 130 to the public network 150. Requests for resources on the public network 150 may traverse this gateway to reach the public network 150. The gateway may communicate with the public network 150 on behalf of devices connected to the network 130. Accordingly, messages originating from the network 130 can be identified by a public network address assigned to the owner or operator of the network 130. For example, the company operating network 130 may be assigned a public IP address range of "1.2.x.x." In such a case, messages originating from the network 130, including those originally sent by device 132, may have a source address in the range "1.2.x.x." In some cases, the device 132 and other devices connected to the network 130 may be assigned an internal IP address for use on the network 130 (e.g., "192.168.x.x." In such a case, this internal IP address will not be used outside of the network 130. The network 130 may also assign public IP addresses to each device connected to the network 130 (e.g., "1.2.x.x"). In such a case, the source address of messages sent by the device 132 may be this public IP address. The network 130 may be a wired or wireless network utilizing one or more network technologies, including, but not limited to, ETHERNET, WI-FI, CDMA, LTE, IP, HTTP, TCP, UDP, or other technologies.

The network 140 may be a public or private network operated by a different entity than network 130. Network 130 and network 140 represent different access networks, as will be described in greater detail below. The public network 150 is a network connecting multiple disparate resources (e.g., servers, networks, etc.). In some cases, the public network 150 is the Internet.

The network management system 120 may be a server or set of servers connected to the public network 150 and operable to receive messages from the devices 132, 142, 144. The network management system 120 may also be a software application running in a distributed computing or "cloud" environment. The network management system 120 receives messages (e.g., heartbeat messages, proxy automatic configuration (PAC) script requests) from the devices 132, 142, 144 and determines the current access network of each device by analyzing the received messages. For example, if the network management system 120 receives a message from the device 132 with a source address of "1.2.3.4," the network management system 120 may consult the database 160 to determine if this source address matches an access network 162. Each access network 162 is associated with an address range 164. Network management system 120 may determine that a device is currently at a particular access network 162 if the source address of a message received from the device is within the address range 164 associated with the particular access network 162. For example, an access network 162 corresponding to the network 130 may be associated with an address range "1.2.x.x." The message received from the device 132 with the source address of "1.2.3.4" matches this address range, and thus the network management system 120 can conclude that the device is currently at the access network 162 corresponding to the network 130.

If the network management system 120 determines that a devices is at a particular access network, the network management system 120 may apply a network policy 166 associated with particular access network 162. For example, the network management system 120 may send a message to the device 132 to configure it according to the network policy 166 associated with its current access network 162. In some cases, the network policies 166 may include configuration settings to be applied to devices that the associated access network 162, including, not limited to, bandwidth limits, access restrictions, encryption requirements, or other settings.

Figure 2:
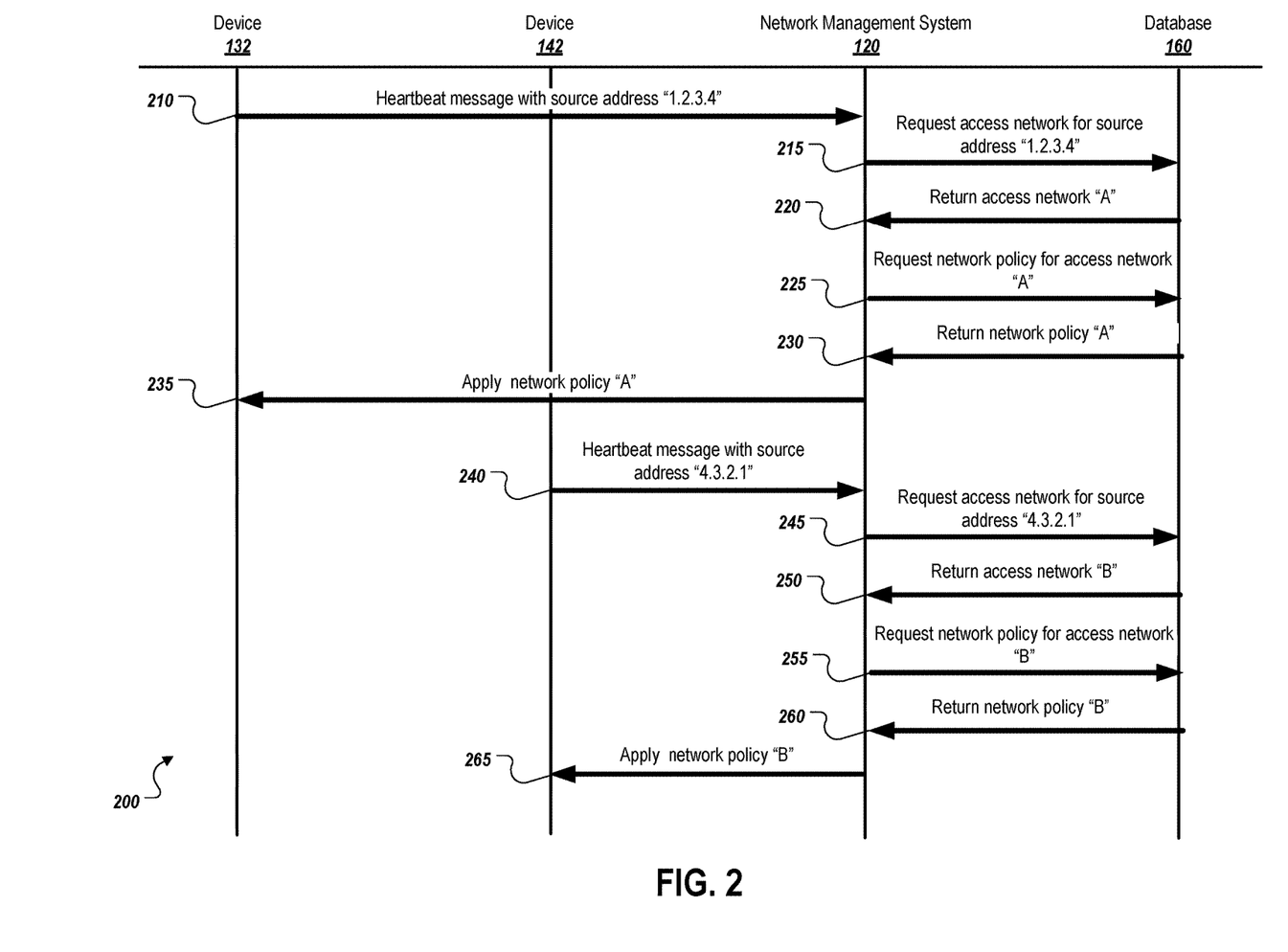
FIG. 2 is a message flow diagram of an example interaction between the components of the example network to apply network policies to devices based on their current access network.

FIG. 2 is a message flow diagram of an example interaction 200 between the components of the example network to apply network policies to devices based on their current access network. At 210, the device 132 sends a heartbeat message to the network management system 120 with source address "1.2.3.4." In some cases, the device 132 may send other types of messages to the network management system 120, including PAC script requests, web requests, configuration requests, authentication requests, or other messages.

At 215, the network management system 120 requests the access network associated with the source address "1.2.3.4" from the database 160. At 220, the database 160 responds with an access network "A." At 225, the network management system 120 requests a network policy for access network "A." At 230, the database 160 returns a network policy associated with the access network "A." At 235, the network management system 120 applies the network policy to the device 132. In some cases, applying network policy to the device 132 may include sending messages to components other than the device 132 (e.g., routers, gateway, policy engines, etc.).

At 240, the device 142 sends a heartbeat message to the network management system 120 with source address "4.3.2.1." In some cases, the device 142 may send other types of messages to the network management system 120, including PAC script requests, web requests, configuration requests, authentication requests, or other messages.

At 245, the network management system 120 requests the access network associated with the source address "4.3.2.1" from the database 160. At 250, the database 160 responds with an access network "B." At 255, the network management system 120 requests a network policy for access network "B." At 260, the database 160 returns a network policy associated with the access network "B." At 265, the network management system 120 applies the network policy to the device 142. In some cases, applying network policy to the device 142 may include sending messages to components other than the device 142 (e.g., routers, gateway, policy engines, etc.).

Figure 3:
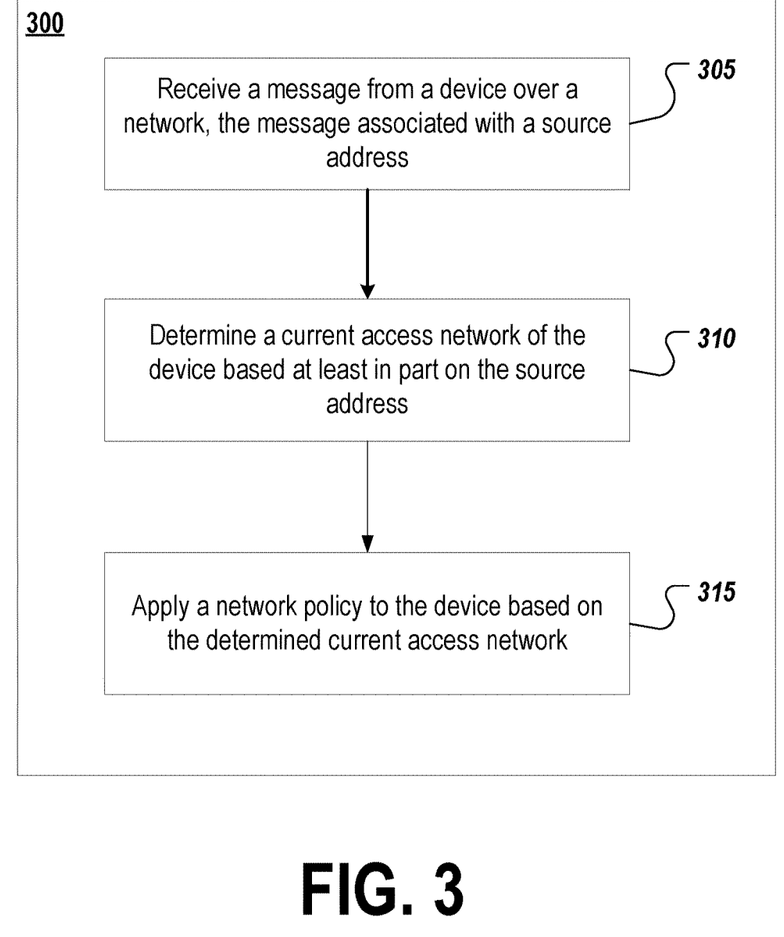
FIG. 3 is a flow chart of an example process of applying network policies to devices based on their current access network.

FIG. 3 is a flow chart of an example process 300 of applying network policies to devices based on their current access network. At 305, a message is received from a device over a network. The message is associated with the source address. In some cases, the network over which the message is received from the device is the Internet. The received message may include a heartbeat message, a proxy automatic configuration (PAC) script request, a configuration request, or other messages.

At 310, a current access network of the device is determined based at least in part on the source address. For example, the current access network may be determined by comparing the source address to an address range for a particular access network, as described above.

At 315, a network policies applied to the device based on the determined current access network. In some cases, the message from the device is received by a server at an access network separate from the current access network of the device. Applying the network policy to the device may include assigning a maximum bandwidth usage parameter to the device. In some implementations, applying the network policy to the device includes restricting access to one or more network resources. Applying the network policy to the device may also include permitting access to one or more network resources.

In some implementations, the process 300 includes identifying one or more known access networks each identified by a particular source address range, wherein the known access networks includes the current access network, and wherein determining the current access network of the device includes determining that the source address associated with the received message is included in the particular source address range associated with the current access network. In some cases, the particular source address range includes a subnet mask. The current access network may include an owner of a particular network associated with the current access network.

Figure 4:
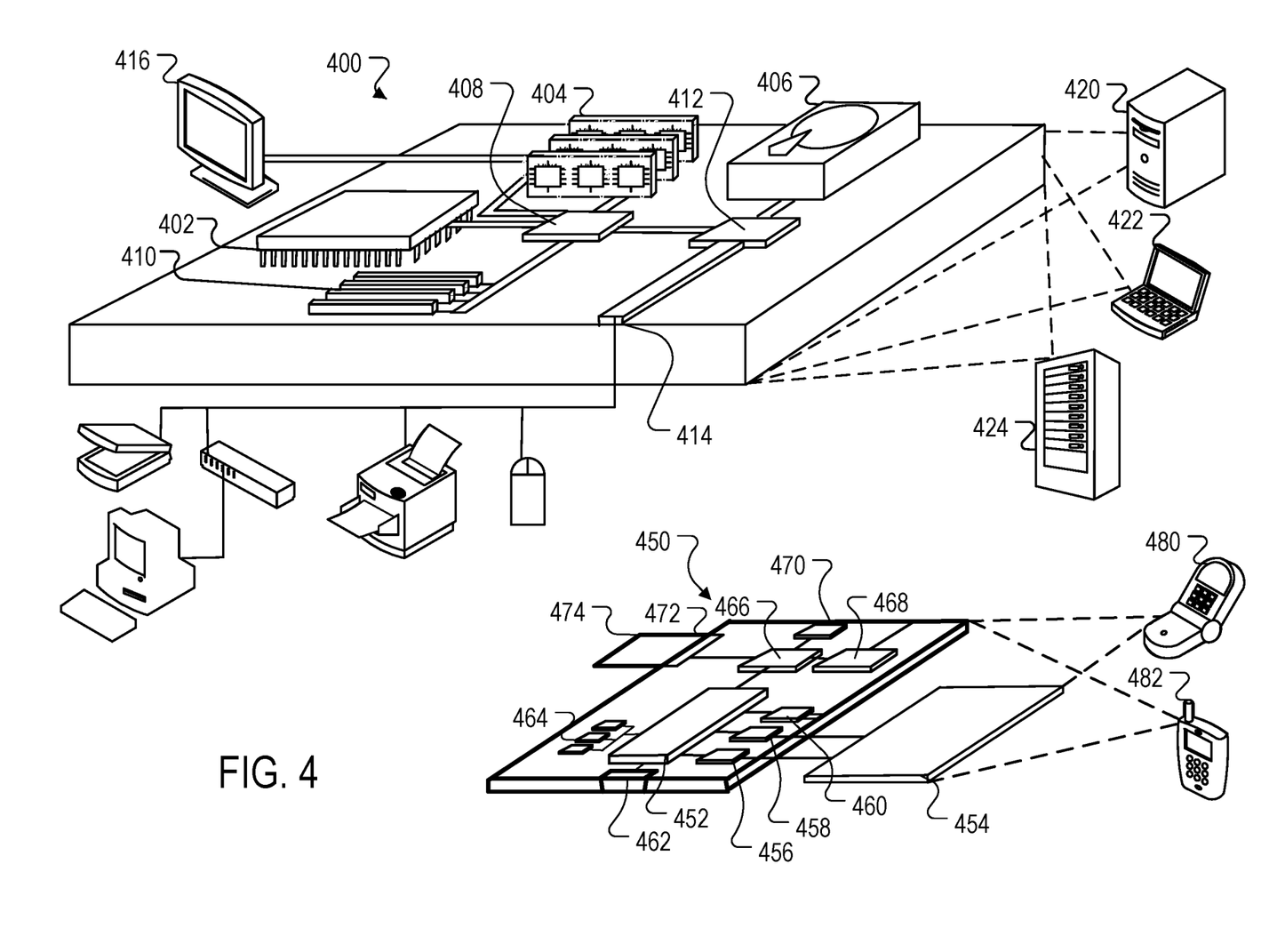
FIG. 4 is a diagram of computing devices that may be used to implement the systems and methods described herein.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. Additionally computing device 400 or 450 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. Additionally, the processor may be implemented using any of a number of architectures. For example, the processor 452 may be a CISC (Complex Instruction Set Computers) processor, a RISC (Reduced Instruction Set Computer) processor, or an MISC (Minimal Instruction Set Computer) processor. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provided as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user, as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front-end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A system for applying network policies to devices, the system comprising:
 a datastore comprising one or more processors and memory, the datastore configured to:
  maintain records of a plurality of access networks that are each configured to provide data connection between computing devices and a public data-network; and
 a network management system comprising one or more processors and memory, the network management system in communication with the public data-network and being configured to:
  receive, over the public data-network, a message from a client device addressed to the network management system containing data for coordination of security services provided by the network management system for the client device, the message including a source address that identifies a network location of the client device;
  determine, using the records maintained by the datastore and the source address of the message, at least one access network that the client device uses to connect to the public data-network;
  applying a network policy to the message from the client device and to future messages from the client device, the network policy determined based on the determined at least one access network that the client devices uses to connect to the public data-network.

2. The system of claim 1, wherein the public data-network is the Internet and the at least one access network is at least one selected from the group consisting of: i) an access network provided by a particular business, ii) a local area network, iii) a wide area network, iv) an ad-hoc peer-to-peer network.

3. The system of claim 1, wherein the system further comprises a policy network that connects the datastore and the network management system, and wherein the datastore is not directly connected to the public data-network.

4. The system of claim 1, wherein the records comprise data that records, for each known access network, at least one corresponding address range that defines a range of network addresses; and
 to determine, using the records maintained by the datastore and the source address of the message, at least one access network that the client device uses to connect to the public data- network, the network management system is configured to compare the source address to the address ranges to identify at least address range that includes the source address.

5. The system of claim 4, wherein the address ranges are subnet masks.

6. The system of claim 4, wherein the network management system is further configured to send, to the datastore, a source-request message that contains the source address; and
 the datastore is configured to, after receiving the source-request:
  identify at least one record based on the source address; and
  send, to the network management system, one or more response messages that comprise an identifier of the access network.

7. The system of claim 6, wherein the one or more response messages further comprise the network policy based on a record indicating that the access network is associated with the network policy.

8. The system of claim 1, wherein the records comprise data that records, for each known access network, at least one corresponding character string; and
 to determine, using the records maintained by the datastore and the source address of the message, at least one access network that the client device uses to connect to the public data-network, the network management system is configured to compare leading values of the source address to the character strings to identify at least address range that includes the source address.

9. The system of claim 8, wherein to compare leading values of the source address to the character strings, the network management system is configured to identify period characters and to compare tokens between period characters.

10. The system of claim 1, wherein the message from the client device is a Hypertext Transfer Protocol (HTTP) message for a request hosted by a webserver that is separate from the network management system and connected to the public data-network.

11. A server device comprising one or more processors and memory, the memory storing instructions, that when executed by the processors, cause the server device to perform operations comprising:
 instantiating a datastore configured to:
  maintain records of a plurality of access networks that are each configured to provide data connection between computing devices and a public data-network; and
 instantiating a network management system configured to:
  receive, over the public data-network, a message from a client device addressed to the network management system containing data for coordination of security services provided by the network management system for the client device, the message including a source address that identifies a network location of the client device;
  determine, using the records maintained by the datastore and the source address of the message, at least one access network that the client device uses to connect to the public data-network;
  applying a network policy to the message from the client device and to future messages from the client device, the network policy determined based on the determined at least one access network that the client devices uses to connect to the public data-network.

12. The server device of claim 11, wherein the public data-network is the Internet and the at least one access network is at least one selected from the group consisting of: i) an access network provided by a particular business, ii) a local area network, iii) a wide area network, iv) an ad-hoc peer-to-peer network.

13. The server device of claim 11, wherein the records comprise data that records, for each known access network, at least one corresponding address range that defines a range of network addresses; and
- to determine, using the records maintained by the datastore and the source address of the message, at least one access network that the client device uses to connect to the public data- network, the network management system is configured to compare the source address to the address ranges to identify at least address range that includes the source address.

14. The server device of claim 13, wherein the address ranges are subnet masks.

15. The server device of claim 13, wherein the network management system is further configured to send, to the datastore, a source-request message that contains the source address; and
- the datastore is configured to, after receiving the source-request:
  - identify at least one record based on the source address; and
  - send, to the network management system, one or more response messages that comprise an identifier of the access network.

16. The server device of claim 15, wherein the one or more response messages further comprise the network policy based on a record indicating that the access network is associated with the network policy.

17. The server device of claim 11, wherein the records comprise data that records, for each known access network, at least one corresponding character string; and
- to determine, using the records maintained by the datastore and the source address of the message, at least one access network that the client device uses to connect to the public data-network, the network management system is configured to compare leading values of the source address to the character strings to identify at least address range that includes the source address.

18. The server device of claim 17, wherein to compare leading values of the source address to the character strings, the network management system is configured to identify period characters and to compare tokens between period characters.

19. The server device of claim 11, wherein the message from the client device is a Hypertext Transfer Protocol (HTTP) message for a request hosted by a webserver that is separate from the network management system and connected to the public data- network.

20. The system of claim 1, wherein the message from a client device addressed to the network management system containing data for coordination of security services provided by the network management system for the client device is one of the group consisting of i) a heartbeat message, ii) a proxy automatic configuration (PAC) script request, iii) web request, iv) configuration request, and v) authentication request.

* * * * *

UNITED STATES PATENT AND TRADEMARK OFFICE
CERTIFICATE OF CORRECTION

PATENT NO. : 11,936,528 B2
APPLICATION NO. : 18/114167
DATED : March 19, 2024
INVENTOR(S) : Paul Michael Martini and Peter Anthony Martini It is certified that error appears in the above-identified patent and that said Letters Patent is hereby corrected as shown below:

In the Claims

Column 10, Line 1, delete "data- network," and insert -- data-network, --;

Column 11, Line 14, delete "data- network," and insert -- data-network, --; and

Column 12, Line 22, delete "data- network," and insert -- data-network, --.

Signed and Sealed this
Fourth Day of June, 2024

*Katherine Kelly Vidal*

Katherine Kelly Vidal
*Director of the United States Patent and Trademark Office*